United States Patent
Horiguchi et al.

(10) Patent No.: US 10,577,502 B2
(45) Date of Patent: Mar. 3, 2020

(54) BRIGHT PIGMENT, METHOD FOR PRODUCING SAME, PIGMENT-CONTAINING COMPOSITION, AND PIGMENT-CONTAINING PAINTED PRODUCT

(71) Applicant: Nippon Sheet Glass Company, Limited, Tokyo (JP)

(72) Inventors: Haruko Horiguchi, Mie (JP); Masahiro Hioki, Mie (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 23 days.

(21) Appl. No.: 15/576,058

(22) PCT Filed: May 27, 2016

(86) PCT No.: PCT/JP2016/002593
§ 371 (c)(1),
(2) Date: Nov. 21, 2017

(87) PCT Pub. No.: WO2016/194352
PCT Pub. Date: Dec. 8, 2016

(65) Prior Publication Data
US 2018/0155551 A1    Jun. 7, 2018

(30) Foreign Application Priority Data

Jun. 2, 2015 (JP) ................................. 2015-112160
Sep. 30, 2015 (JP) ................................. 2015-193901

(51) Int. Cl.
*C09C 1/00*    (2006.01)
*C09D 5/29*    (2006.01)
*C09D 7/40*    (2018.01)

(52) U.S. Cl.
CPC .......... *C09C 1/0078* (2013.01); *C09C 1/0021* (2013.01); *C09D 5/29* (2013.01); *C09D 7/40* (2018.01); *C01P 2006/65* (2013.01); *C01P 2006/66* (2013.01); *C09C 2200/102* (2013.01); *C09C 2200/1025* (2013.01); *C09C 2200/24* (2013.01); *C09C 2200/302* (2013.01); *C09C 2200/502* (2013.01); *C09C 2220/106* (2013.01)

(58) Field of Classification Search
CPC ................ C09C 1/0078; C09C 1/0021; C09C 2200/102; C09C 2200/1025; C09C 2200/24; C09C 2200/302; C09C 2200/502; C09C 2220/106; C09D 7/40; C09D 5/29; C01P 2006/65; C01P 2006/66
See application file for complete search history.

(56) References Cited

U.S. PATENT DOCUMENTS

| | | | |
|---|---|---|---|
| 4,954,176 A | 9/1990 | Minohara et al. | |
| 5,308,394 A | 5/1994 | Minohara et al. | |
| 2008/0318012 A1* | 12/2008 | Domnick .............. | C09C 1/0015 428/216 |

FOREIGN PATENT DOCUMENTS

| | | | | |
|---|---|---|---|---|
| CN | 1071150 | | 4/1993 | |
| CN | 104559329 | | 4/2015 | |
| DE | 3229837 | * | 4/1984 | ............... C09C 1/28 |
| DE | 3229837 | * | 2/1990 | ............... C09C 1/00 |
| EP | 0327739 A1 | | 8/1989 | |
| EP | 3305858 A1 | | 4/2018 | |
| JP | H01108267 A | | 4/1989 | |
| JP | 02032170 | * | 2/1990 | ............... C09C 1/36 |
| JP | H0232170 A | | 2/1990 | |
| JP | H03287670 A | | 12/1991 | |
| JP | 2001031421 A | | 2/2001 | |
| JP | 2003012962 A | | 1/2003 | |
| JP | 2003509530 A | | 3/2003 | |
| JP | 2006299051 A | | 11/2006 | |
| JP | 2008063525 A | | 3/2008 | |
| JP | 2009242795 A | | 10/2009 | |
| WO | 0118126 A1 | | 3/2001 | |
| WO | 2008156948 | | 12/2008 | |
| WO | 2010125885 A1 | | 11/2010 | |
| WO | WO 2010/125885 | * | 11/2010 | ............... C09C 3/06 |
| WO | 2016194902 A1 | | 12/2016 | |

OTHER PUBLICATIONS

Extended European Search Report issued for European Patent Application No. 16802794.4, dated Feb. 12, 2019, 5 pages.
International Search Report issued for International Application No. PCT/JP2016/002593, dated Aug. 30, 2016, 5 pages including English translation.
Bai, Zhenzhong et al., "Handbook of Engineering Glass Deep Processing Technology," Beijing: China Building Materials Industry Press, Apr. 2014, p. 285 (4 pages including partial English translation).
Office Action issued for Chinese Patent Application No. 201680031835.0, dated May 20, 2019, 18 pages including English machine translation.

* cited by examiner

*Primary Examiner* — Pegah Parvini
(74) *Attorney, Agent, or Firm* — Hamre, Schumann, Mueller & Larson, P.C.

(57) ABSTRACT

A bright pigment according to the present invention includes: a glass flake; a titanium oxide layer formed over the glass flake; and fine gold particles deposited on the titanium oxide layer or placed between the glass flake and the titanium oxide layer. The titanium oxide layer has a thickness of 150 nm or more, and a reflected color of the bright pigment is a blue to green color represented by a C* value of 15 or more and a h value of 150 to 300 in a L*C*h color system.

10 Claims, No Drawings

BRIGHT PIGMENT, METHOD FOR PRODUCING SAME, PIGMENT-CONTAINING COMPOSITION, AND PIGMENT-CONTAINING PAINTED PRODUCT

TECHNICAL FIELD

The present invention relates to bright pigments and particularly relates to a bright pigment including a glass flake as a substrate and showing a blue or green color. The present invention also relates to a composition containing a bright pigment and to a painted product having a paint film containing a bright pigment.

BACKGROUND ART

Bright pigments are incorporated in products that can have added value if capable of reflecting light with sparkles like those of stars, and examples of the products include paints used for painting automobiles, inks used in writing instruments, and cosmetics such as foundations and lipsticks. The use of a glass flake as a substrate of a bright pigment is known to provide superior appearance features such as high brightness and clear sparkles. There is also a commercially-available bright pigment that exhibits a specific color by means of interference color caused by a titanium oxide layer formed on the substrate of the pigment.

A proposed approach for allowing a bright pigment to exhibit a color with enhanced vividness is to deposit fine metal particles on the surface of the bright pigment and exploit a color formed by surface plasmon resonance of the fine metal particles.

Patent Literature 1 discloses bright pigments each produced by bringing a specific lamellar pigment into contact with a colloidal metal solution to deposit fine metal particles on the lamellar pigment. Example 4 of Patent Literature 1 is an example of bright pigment production, in which fine gold particles (colloidal gold particles) are deposited on a red pigment constituted by glass flakes whose surfaces are coated with a titanium oxide layer. Colloidal gold particles have traditionally been known as a red-color former and, in the above example, the use of colloidal gold particles enhances the vividness of the red pigment. Also in other examples presented in Patent Literature 1, fine gold particles are used as a red-color former for improving the color exhibited by lamellar pigments (Examples 1 to 3, and 6).

In Example 6 of Patent Literature 1, a bright pigment is produced by depositing fine gold particles on a blue lamellar pigment (titanated mica). Also in this example, the color exhibited by the fine gold particles is confirmed to be red. Referring to the table which collectively shows the results for the examples, it is seen that the improvement in vividness is smaller in Example 6 where the color (blue) exhibited by the lamellar pigment is different from the color (red) exhibited by the fine gold particles than in other examples (Examples 1 to 5) where the color exhibited by the metal oxide layer is the same as the color formed by surface plasmon resonance.

CITATION LIST

Patent Literature

Patent Literature 1: JP 2006-299051 A

SUMMARY OF INVENTION

Technical Problem

As indicated by Patent Literature 1, the use of fine gold particles, which are considered particularly effective for enhancing the color vividness, has hitherto yielded a successful result only for red pigments. In Patent Literature 1, the enhancement of the vividness of a yellow pigment is achieved by exploiting a yellow color exhibited by fine silver particles (Example 5). However, any effective approach for improving the vividness of a bright pigment presenting a color other than red has not yet been proposed, at least as far as improvement by means of fine gold particles is concerned. There is a strong demand for improvement in the vividness of pigments showing a blue or green color.

In view of the above circumstances, it is an object of the present invention to enhance the vividness of a bright pigment showing a blue or green color. Another object of the present invention is to provide a method suitable for producing a bright pigment that exhibits a vivid blue or green color.

Solution to Problem

The present invention provides a bright pigment including: a glass flake; a titanium oxide layer formed over the glass flake; and fine gold particles deposited on the titanium oxide layer or placed between the glass flake and the titanium oxide layer, wherein the titanium oxide layer has a thickness of 150 nm or more, and a reflected color of the bright pigment, as measured using illuminant D65, is represented by a $C^*$ value of 15 or more and a h value of 150 to 300 in a $L^*C^*h$ color system.

When the h value, also called hue angle, is in the range of 150 to 300 for a color, this means that the color is blue or green. The $C^*$ value represents the chroma of a color, and the greater the $C^*$ value is, the more vivid the color is.

In another aspect, the present invention provides a method for producing a bright pigment including a glass flake, a titanium oxide layer formed over the glass flake, and fine gold particles deposited on the titanium oxide layer or placed between the glass flake and the titanium oxide layer, the method including:

a deposition step of bringing a substrate pigment including the glass flake with the titanium oxide layer or the glass flake into contact with a colloidal gold solution containing fine gold particles with an average particle diameter of 1 to 40 nm so as to deposit the fine gold particles on the titanium oxide layer of the substrate pigment or on the glass flake; and a heating step of heating the substrate pigment having the fine gold particles deposited thereon or a fine particle-enclosing pigment having the titanium oxide layer formed over the surface of the glass flake having the fine gold particles deposited thereon so that a reflected color of the heated substrate pigment having the fine gold particles deposited thereon or the heated fine particle-enclosing pigment, as measured using illuminant D65, has an increased $C^*$ value in a $L^*C^*h$ color system, wherein the titanium oxide layer of the substrate pigment or the titanium oxide layer of the fine particle-enclosing pigment has a thickness of 150 nm or more, and a reflected color of the bright pigment, as measured using illuminant D65, is represented by a $C^*$ value of 15 or more and a h value of 150 to 300 in the $L^*C^*h$ color system.

Advantageous Effects of Invention

The present invention can enhance the vividness of a bright pigment showing a blue or green color. The present invention also provides a method suitable for producing a bright pigment that exhibits a vivid blue or green color.

DESCRIPTION OF EMBODIMENTS

Hereinafter, the present invention will be described in detail. The following description is not intended to limit the present invention to specific embodiments.

A bright pigment provided by the present invention includes: a glass flake; a titanium oxide layer formed over the glass flake; and fine gold particles deposited on the titanium oxide layer or placed between the glass flake and the titanium oxide layer. The reflected color of this bright pigment is blue or green. The term "blue or green" is used herein to refer to a color represented by a h value of 150 to 300 in the L*C*h color system. The term "blue" is used herein to refer to a color represented by a h value of 225 to 300, in particular 240 to 300, in the color system, and the term "green" is used herein to refer to a color represented by a h value of 150 to 225, in particular 150 to 210, in the color system. A color represented by a h value of 210 to 240 in the color system is considered herein to be "blue or green", although, to be precise, such a color is intermediate (bluish green) between blue and green.

Glass flakes are fine, lamellar pieces of glass which can be called scaly glass particles. The glass composition for forming the glass flakes is not particularly limited. A glass composition containing silicon dioxide as a main component and further containing other metal oxides such as aluminum oxide, calcium oxide, and sodium oxide is typically used. The term "main component" is used herein to refer to a component whose content is highest in terms of mass. Examples of glass compositions that can be used include soda-lime glass, A-glass, C-glass, E-glass, borosilicate glass, and aluminosilicate glass.

The preferred average particle diameter of the glass flakes is 3 to 500 μm, in particular 3 to 200 μm. The average particle diameter of the glass flakes is determined as a particle diameter (D50) at 50% by volume in a cumulative undersize distribution of light scattering-based particle sizes measured by laser diffractometry. The preferred thickness of the glass flakes is 0.1 to 50 μm, in particular 0.1 to 10 μm.

The glass flakes can be produced, for example, by a blowing process. The blowing process includes: melting glass cullet; discharging the molten glass continuously through a circular slit while blowing a gas such as air to the molten glass from a blowing nozzle provided inwardly of the circular slit to inflate the molten glass into a balloon; and crushing the inflated, thinned glass into flakes (scaly particles). Examples of glass flakes that can be used include commercially-available glass flakes sold as "GLASFLAKE" (registered trademark) by Nippon Sheet Glass Co., Ltd.

The surfaces of glass flakes are smoother, and more apt to reflect light without scattering, than the surfaces of crystalline particles such as mica. Additionally, glass flakes are transparent, and a bright pigment including a glass flake as a substrate is thus less likely to produce opaque reflected color which may be observed when translucent crystalline particles are used. A bright pigment including a glass flake as a substrate is likely to provide favorable light reflection properties leading to appearance features such as high brightness and clear sparkles. The use of glass flakes is advantageous also in achieving a high C* value.

Titanium oxide has a high refractive index and is suitable for forming a layer with desired color formation performance. Titanium oxide can have three types of crystal structures, namely the anatase-type, brookite-type, and rutile-type structures, and anatase-type titanium oxide and rutile-type titanium oxide are industrially manufactured. The rutile-type structure is preferred among the crystal structures of titanium oxide. Rutile-type titanium oxide has a low photocatalytic activity and thus has a low impact on a matrix material such as a paint to which a bright pigment is added. Furthermore, rutile-type titanium oxide has the highest refractive index among the three types of titanium oxide.

The formation of a rutile-type titanium oxide layer on a glass flake may be carried out according to a method disclosed, for example, in JP 2001-31421 A or JP 2003-12962 A. In the method disclosed in these patent publications, rutile-titanium oxide is precipitated on glass flakes in a solution containing a titanium compound such as titanium tetrachloride, and thus a film is formed on the glass flakes. The precipitation of rutile-type titanium oxide on the glass flakes can be caused by adding an alkaline compound or alkaline solution to the titanium compound-containing solution having a temperature of 55 to 85° C. and a pH of 1.3 or less. Preliminarily depositing tin or a tin compound on the glass flakes facilitates the precipitation of rutile-type titanium oxide. This method can be used also to form a rutile-type titanium oxide layer over glass flakes on which fine gold particles have been deposited. With the use of this method, a rutile-type titanium oxide layer can be formed without the need for heating for crystal transformation.

Glass flakes with a rutile-type titanium oxide layer formed on the surfaces thereof are sold as "METASHINE (registered trademark) Titania Coat" by Nippon Sheet Glass Co., Ltd. Such a commercially-available product may be used as a substrate pigment on which fine gold particles are to be deposited.

A substrate pigment having a titanium oxide layer exhibits a color resulting from optical interference by the layer, and the color varies depending on the thickness of the layer. A titanium oxide layer formed on glass flakes presents a yellow color at a thickness of around 100 nm, a red color at a thickness of around 130 nm, a blue color at a thickness of around 160 nm, and a green color at a thickness of around 175 nm. Depending on the layer formation conditions and other factors, the color produced by the titanium oxide layer may slightly vary even when the thickness of the layer is unchanged. To produce a blue color, it is preferable for the titanium oxide layer to have a thickness in the range of 150 to 165 nm. To produce a green color, it is preferable for the titanium oxide layer to have a thickness of more than 165 nm and not more than 185 nm. That is, in the present invention, the thickness of the titanium oxide layer is preferably in the range of 150 to 185 nm.

Fine gold particles can be deposited on a titanium oxide layer or on the surfaces of glass flakes by bringing a colloidal gold solution into contact with the glass flakes with or without the titanium oxide layer formed thereon. In this case, it is recommended to adjust the pH of the solution to an appropriate range such as the range of 1 to 5, preferably 2 to 4. The colloidal gold solution may be prepared according to a commonly-known method. For example, the colloidal gold solution can be prepared by reducing a gold compound such as chloroauric acid in a solution to which a stabilizer has been added. Known examples of the stabilizer include citric acid, which acts also as a reductant, and casein.

The vivid red color of fine gold particles is due to surface plasmon resonance. Fine gold particles (colloidal gold particles) contained in a colloidal gold solution as prepared by the above known method typically have an average particle diameter of around 5 to 40 nm, in particular around 5 to 30 nm, and present a red color. However, it is also possible to obtain colloidal gold particles having an average particle diameter of around 1 to 5 nm by using a different method. When colloidal gold particles aggregate into larger-size particles, the absorption wavelength shifts to longer wavelengths, so that the color exhibited by the particles changes from red to pale blue or purple. However, the control of the particle diameter of colloidal gold particles in a colloidal gold solution is difficult, and a color other than red cannot be exhibited as vividly as a red color at short wavelengths. In practice, therefore, fine gold particles have been used as a colorant for forming a red color and, when a color other than red is to be exhibited, other particles such as fine silver particles which exhibit a yellow color have been used (Patent Literature 1). The average particle diameter of fine gold particles (colloidal gold particles) can be measured using a transmission electron microscope (TEM). When determining the average particle diameter of fine gold particles, it is recommended to measure the diameters of, for example, 10 to 20 particles or preferably 100 particles and calculate the average of the measured diameters as the average particle diameter.

Fine gold particles can significantly improve the vividness of a blue or green color exhibited by glass flakes with a titanium oxide layer formed on the surfaces thereof, although this may seem to be inconceivable from the traditional knowledge as described above. The improvement can be achieved, for example, by depositing fine gold particles with an average particle diameter of 1 to 40 nm onto a titanium oxide layer of a substrate pigment from a colloidal gold solution containing the fine gold particles and then heating the substrate pigment. The improvement can also be achieved by depositing fine gold particles with an average particle diameter of 1 to 40 nm onto glass flakes from a colloidal gold solution containing the fine gold particles, then forming a titanium oxide layer over the glass flakes, and subsequently heating the glass flakes. The average particle diameter of the fine gold particles is desirably 3 nm or more and more desirably 5 nm or more. It is inferred that the heating changes the state of the fine gold particles lying on the titanium oxide layer or between the glass flake and the titanium oxide layer, thereby changing the color exhibited by the fine gold particles and enhancing the color vividness. Examples of the changes in the state of the fine gold particles include those which can influence the color exhibited by the fine gold particles, such as: a change in the positions of the fine gold particles present in contact with or close to each other, namely, a change in the aggregation state of the fine gold particles (rearrangement); and a change in the crystal state of the fine gold particles which is observed as a change in crystallite diameter. The present invention can be implemented using a colloidal gold solution containing fine gold particles (colloidal gold particles) having an average particle diameter as specified above.

It should, however, be noted that the change in the aggregation state of the fine gold particles on the titanium oxide layer may become less likely to occur depending on the type and concentration of the stabilizer contained in the colloidal gold solution. Many of the commercially-available colloidal gold solutions as used in Patent Literature 1 contain a stabilizer having a high anti-aggregation effect to keep a high concentration of colloidal gold particles dispersed, and typical examples of the stabilizer include casein, gelatin, polyvinyl alcohol (PVA), polyvinylpyrrolidone (PVP), and polyethylene glycol (PEG). If, however, such a stabilizer is present at a high concentration, the aggregation state of the fine gold particles cannot be readily changed even by heating. To facilitate the change in the aggregation state of fine gold particles, it is preferable to use a colloidal gold solution containing fine gold particles that are formed with the aid of a reductant such as citric acid acting also as a stabilizer and that are kept dispersed in the solution without addition of any other stabilizer than the reductant.

The vividness of the reflected color of a substrate pigment with a titanium oxide layer formed thereon, as expressed by a $C^*$ value in the $L^*C^*h$ color system, is typically 10 or less and is, for example, in the range of 4 to 10. With the use of the present invention, the vividness of the reflected color of a bright pigment based on the substrate pigment, as expressed by a $C^*$ value in the $L^*C^*h$ color system, can be increased to 15 or more, even 20 or more, or, in some cases, 23 or more, and may be 25 or more, in particular 30 or more, or, in some cases, 32 or more. As described below, the vividness of the color of a substrate pigment presenting a red color attributed to a titanium oxide layer was around 22 as expressed by a $C^*$ value when fine gold particles presenting the same color, namely a red color, were deposited on the surface of the pigment. The increase in vividness up to or above a $C^*$ value of 25 deserves special attention. The increase in vividness above that of a red bright pigment can be accomplished also by carrying out the heat treatment with the fine gold particles interposed between the glass flakes and the titanium oxide layers.

No appropriate approach for enhancing the color vividness of a substrate pigment presenting a blue or green color attributed to a titanium oxide layer has been found, unlike for red substrate pigments. Given that the $C^*$ value of a blue or green pigment coated with a titanium oxide layer is as described above (around 6 to 7 for commercially-available products), the increase in vividness up to or above a $C^*$ value of 15 is of significance as far as these colors are concerned.

Typically, the color vividness is more enhanced when a blue substrate pigment is used than when a green substrate pigment is used. This can be explained by a phenomenon where the color of a colloidal gold solution changes from red to pale blue or purple with an increase in the diameter of the colloidal gold particles in the colloidal gold solution, namely by the fact that, in general, a colloidal gold solution can exhibit a blue color, albeit pale, while being unable to exhibit a green color. It is inferred that the color vividness of a blue (h: 225 to 300) bright pigment is increased to as high as a $C^*$ value of 25 or more by virtue of high similarity between the color attributed to the titanium oxide layer and the color attributed to the fine gold particles.

In view of the change in the aggregation state of the fine gold particles, the heating of the substrate pigment having the fine gold particles deposited thereon is preferably carried out in a state where any film other than the titanium oxide layer for producing interference color is not in contact with the fine gold particles, in particular in a state where the fine gold particles are exposed on the titanium oxide layer. It is therefore particularly preferable for the production method according to the present invention to include a deposition step of depositing fine gold particles on a titanium oxide layer of a substrate pigment and a heating step of heating the substrate pigment in the absence of any film covering the fine gold particles. This is because the presence of a film covering the fine gold particles may, depending on the type of the film, significantly hinder the heat-induced change in the aggregation state of the fine gold particles. For example, in Example 4 of Patent Literature 1, fine gold particles coated with a silicon oxide layer and having a particle diameter of about 10 nm are heated at 700° C. The fine gold particles heated are believed to exhibit a red color as they do before heating, given that the color of the appearance of the resulting pigment as well as the interference color is described as being "red". When an end product needs to have a film such as a protective film or barrier film which covers the fine gold particles and which is in contact with the fine gold particles, the heating for changing the aggregation state of the fine gold particles is preferably followed by formation of the film.

The increase in C* value (ΔC*) resulting from the deposition of the fine gold particles and the subsequent heating in the present invention can be 10 or more, even 20 or more, or, in particular, 25 or more.

The preferred temperature for the heating of the substrate pigment having the fine gold particles deposited thereon is typically 80° C. or above, and is specifically 100 to 900° C., 350 to 750° C., or, in particular, 500 to 700° C. The preferred time for the heating of the substrate pigment having the fine gold particles deposited thereon is typically 5 minutes to 3 hours, or, in particular, 30 minutes to 2.5 hours. It should be understood that the heating temperature and the heating time may be appropriately adjusted using the degree of improvement in color vividness as a measure.

When the heating temperature is high, the crystallite diameter of the fine gold particles increases. The higher the temperature is, the greater the amount of the increase in crystallite diameter is, and the vividness of reflected color is enhanced with an increase in crystallite diameter. In the bright pigment according to the present invention, the crystallite diameter of the fine gold particles is 12 nm or more and preferably 14 nm or more, and may in some cases be 20 nm or more. The upper limit of the crystallite diameter of the fine gold particles is not particularly limited. For example, the crystallite diameter is 100 nm or less or even 50 nm or less.

The content of the fine gold particles may be adjusted depending on the desired color to be exhibited and is, for example, 0.01 to 3%, preferably 0.03 to 2%, and more preferably 0.05 to 1%. The term "content" as used herein refers to the ratio of the mass of the fine gold particles to the total mass of the glass flake, the titanium oxide layer, and the fine gold particles in the bright pigment.

The bright pigment according to the present invention exhibits a vivid color when incorporated in various compositions. In another aspect, the present invention provides a pigment-containing composition including the bright pigment according to the present invention. An example of the pigment-containing composition is at least one selected from a paint, an ink, a cosmetic, and a resin composition. An example of the resin composition is a molded product of artificial marble.

In still another aspect, the present invention provides a pigment-containing painted product including a substrate material and a paint film formed on the substrate material, the paint film containing the bright pigment according to the present invention. The pigment-containing painted product may be painted paper. In this case, the substrate material is paper. The substrate material is not limited to paper, and may be a metal, resin, ceramic, or another material. The paint film may be composed of the pigment-containing composition according to the present invention or may be formed by applying the pigment-containing composition according to the present invention onto the substrate material.

Preferred embodiments and specific examples of the pigment-containing composition and the pigment-containing painted product are as disclosed in publications of patent applications previously filed by the applicant of the present invention (JP 2008-63525 A, for example), and such compositions and painted products themselves are well-known. Descriptions of the composition and the painted product are therefore omitted herein, and only the cosmetic will be described.

Examples of the cosmetic include facial cosmetics, makeup cosmetics, and hair cosmetics. In particular, the bright pigment according to the present embodiment is especially suitable for use in makeup cosmetics such as eye shadow, nail enamel, eyeliner, mascara, lipstick, and fancy powder. The form of the cosmetic is not particularly limited, and the cosmetic may be, for example, in the form of a powder, cake, pencil, stick, ointment, liquid, emulsion, or cream.

As demonstrated in Examples described below, reflected light from a pigment-containing composition or pigment-containing painted product including a bright pigment according to a preferred embodiment of the present invention shows a large increase in so-called "highlight" and a large decrease in so-called "shade" compared to reflected light from a composition or painted product prepared by adding a substrate pigment, and the pigment-containing composition or pigment-containing painted product according to the preferred embodiment of the present invention accordingly presents a more accentuated metallic appearance. The decrease in shade is presumably because rearrangement of the fine gold particles leads to increased uniformity of the direction of light reflection from the particles and therefore to reduced diffuse reflection.

EXAMPLES

Example 1

Blue Bright Pigment

Preparation of Colloidal Gold Solution

An amount of 25 g of chloroauric acid tetrahydrate (a powder, manufactured by Ohura Precious Metal Industry Co., ltd. and having a purity of 99.0% or more) was diluted with 240 g of water to prepare a 10.4 wt % chloroauric acid solution. Additionally, sodium citrate (manufactured by Nacalai Tesque Inc.) was diluted with pure water to prepare a 10 wt % sodium citrate solution. A 1 L round-bottom flask was charged with 2.0 g of the 10.4 wt % chloroauric acid solution and 993.5 g of pure water, and the contents of the flask were heated under reflux at a constant temperature of 100° C. for 30 minutes. Subsequently, 4.5 g of the 10 wt % sodium citrate solution was added to the round-bottom flask, and the contents of the flask were further heated under reflux at a constant temperature of 100° C. for 30 minutes, after which the round-bottom flask was cooled to room temperature in water, giving a colloidal gold solution. The primary particle diameters of the fine gold particles (colloidal gold particles) thus obtained were measured with a transmission electron microscope (TEM), and the average particle diameter of the particles was calculated. The average particle diameter of the colloidal gold particles was in the range of 5 to 10 nm.

Deposition of Fine Gold Particles on Substrate Pigment

An amount of 800 g of the colloidal gold solution prepared by the above synthesis procedure and 50 g of a blue substrate pigment were placed in a 1 L beaker. The substrate pigment used was "METASHINE MT1030RB" (manufactured by Nippon Sheet Glass Co., Ltd.) constituted by glass flakes coated with a 160-nm-thick rutile-type titanium oxide layer. The glass flakes constituting this substrate pigment and the other substrate pigments used below have a particle diameter of about 33 μm and a thickness of about 1.3 μm. While the colloidal gold solution and the substrate pigment were stirred with a stirring blade in the beaker, hydrochloric acid was added to adjust the pH to 2 to 4. The stirring was continued for 10 minutes. Afterwards, a bright pigment was separated from the supernatant by filtration, and the bright pigment was heat-treated at 600° C. for 2 hours. A bright pigment exhibiting a vivid blue color was thus obtained.

Example 2

Blue Bright Pigment

Deposition of Fine Gold Particles on Glass Flakes

An amount of 2 g of the colloidal gold solution prepared by the above synthesis procedure and 50 g of glass flakes were placed in a 1 L beaker. The glass flakes used (manufactured by Nippon Sheet Glass Co., Ltd.) have an average particle diameter of 33 μm and a thickness of 1.3 μm. While the colloidal gold solution and the glass flakes were stirred with a stirring blade in the beaker, hydrochloric acid was added to adjust the pH to 2 to 4. The stirring was continued for 10 minutes. Afterwards, the glass flakes were separated from the supernatant by filtration, dried at 180° C., and then heat-treated at 600° C. for 2 hours to obtain glass flakes with fine gold particles deposited thereon.

Coating with Titanium Oxide Layer

Ion-exchanged water was added to 50 g of the glass flakes with fine gold particles to a total volume of 500 ml, and dilute hydrochloric acid was added to the glass flakes and ion-exchanged water under stirring to adjust the pH to 1.5, giving a slurry. To the resulting slurry was added 67 ml of a 0.7 wt % aqueous tin(IV) chloride solution at ordinary temperature, and then dilute hydrochloric acid was added to adjust the pH to 1.5, giving a mixed slurry. The resulting mixed slurry was stirred for 5 minutes, after which the glass flakes were collected from the mixed slurry by filtration under reduced pressure. The collected glass flakes were washed with ion-exchanged water to obtain glass flakes pretreated with tin.

Ion-exchanged water was added to 50 g of the tin-treated glass flakes to a total volume of 500 ml. After that, 35 wt % hydrochloric acid was added to adjust the pH to 1.0, and the resulting mixture was heated to 75° C. Next, an aqueous titanium tetrachloride solution (having a Ti content of 16.5 wt %) was added to the mixture under stirring at a constant rate of 12 g per hour, while a 10 wt % aqueous sodium hydroxide solution was also added at a constant rate of 58 ml per hour. The addition of the aqueous titanium tetrachloride solution and the aqueous sodium hydroxide solution was continued to form a rutile-type titanium oxide layer having a bright, pearl-like blue color over the surfaces of the glass flakes having the fine gold particles deposited thereon. In this manner, a fine particle-enclosing pigment having the fine gold particles enclosed between the glass flakes and the titanium oxide layers was obtained. For the formation of the titanium oxide layer, the time required to allow the layer to have a thickness of 160 nm was predetermined, and the addition of the aqueous titanium tetrachloride solution and the aqueous sodium hydroxide solution was continued for the predetermined time. Afterwards, the fine particle-enclosing pigment was collected by filtration under reduced pressure, washed with pure water, dried at 180° C., and then heat-treated at 600° C. for 2 hours. A bright pigment exhibiting a vivid blue color was thus obtained.

Example 3

Green Bright Pigment

An amount of 800 g of a colloidal gold solution prepared in the same manner as in Example 1 and 50 g of a green substrate pigment were placed in a 1 L beaker. The substrate pigment used was "METASHINE MT1030RG" (manufactured by Nippon Sheet Glass Co., Ltd.) constituted by glass flakes coated with a 175-nm-thick rutile-type titanium oxide layer. While the colloidal gold solution and the substrate pigment were stirred with a stirring blade in the beaker, hydrochloric acid was added to adjust the pH to 2 to 4. The stirring was continued for 10 minutes. Afterwards, a bright pigment was separated from the supernatant by filtration, and the bright pigment was heat-treated at 700° C. for 2 hours. A bright pigment exhibiting a green color was thus obtained.

Example 4

Green Bright Pigment

A bright pigment exhibiting a green color was obtained in the same manner as in Example 2, except that the addition of the aqueous titanium tetrachloride solution and the aqueous sodium hydroxide solution for rutile-type titanium oxide layer formation was continued for a longer time to form a rutile-type titanium oxide layer having a pearl-like green color. For the formation of the titanium oxide layer, the time required to allow the layer to have a thickness of 175 nm was predetermined, and the addition of the solutions was continued for the predetermined time.

Comparative Example

Yellow Bright Pigment

Preparation of Colloidal Gold Solution

An amount of 3.8 mg of casein (manufactured by KANTO CHEMICAL CO., INC.) was added to 5.2 ml of 3-amino-1-propanol (manufactured by Wako Pure Chemical Industries, Ltd.) diluted to 5.52 mol/L, and the mixture was stirred for 15 minutes to dissolve casein. This was followed by the addition of 0.8 ml of a 0.2 mol/L chloroauric acid solution (manufactured by Mitsuwa Chemicals Co., Ltd.) and then by stirring. To the resulting solution was added a reductant solution prepared by dissolving 4.7 mg of dimethylamine borane (manufactured by Wako Pure Chemical Industries, Ltd.) and 158 mg of sodium ascorbate (manufactured by Wako Pure Chemical Industries, Ltd.) in 2 ml of pure water. The mixed solution was heated at 80° C. to prepare a colloidal gold solution. The molar ratio of casein to gold, as determined from the amounts of the materials used, was 0.010. The average particle diameter of the fine gold particles (colloidal gold particles) thus obtained was measured in the same manner as in Examples and was determined to be in the range of 5 to 10 nm.

Deposition of Fine Gold Particles on Substrate Pigment

An amount of 2 g of the colloidal gold solution prepared by the above synthesis procedure and 50 g of a yellow substrate pigment were placed in a 1 L beaker. The substrate pigment used was "METASHINE MT1030RY" (manufactured by Nippon Sheet Glass Co., Ltd.) constituted by glass flakes coated with a 100-nm-thick rutile-type titanium oxide layer. While the colloidal gold solution and the substrate pigment were stirred with a stirring blade in the beaker, hydrochloric acid was added to adjust the pH to 2 to 4. The stirring was continued for 10 minutes. Afterwards, a bright pigment exhibiting a slightly yellowish orange color was separated from the supernatant by filtration.

Reference Example 1

Red Bright Pigment

Preparation of Colloidal Gold Solution

A colloidal gold solution was prepared in the same manner as in Comparative Example.

Deposition of Fine Gold Particles on Substrate Pigment

A bright pigment exhibiting a red color was obtained in the same manner as in Comparative Example, except that "METASHINE MT1030RR" (manufactured by Nippon Sheet Glass Co., Ltd. and having a red color) constituted by glass flakes coated with a 130-nm-thick rutile-type titanium oxide layer was used as a substrate pigment.

Reference Example 2

Red Bright Pigment

Preparation of Colloidal Gold Solution

A colloidal gold solution was prepared in the same manner as in Comparative Example.

Deposition of Fine Gold Particles on Substrate Pigment

A bright pigment exhibiting a red color was obtained in the same manner as in Comparative Example, except that glass flakes (manufactured by Nippon Sheet Glass Co., Ltd.) having an average particle diameter of 33 μm and a thickness of 1.3 μm and uncoated with a titanium oxide layer were used as a substrate pigment.

(Color Measurement of Powders)

Color measurement of the bright pigment powders obtained in Examples, Comparative Example, and Reference Examples and the substrate pigment powders employed in Examples, Comparative Example, and Reference Examples was carried out using a spectrocolorimeter,"CM-5" (manufactured by KONICA MINOLTA, INC.). Each of the powders was put in a small petri dish (dia.=3 mm) when subjected to the color measurement. The color measurement was carried out by SCE (specular component excluded) method using illuminant D65 as a light source at a viewing angle of 2°. The results are shown in Table 1.

(Fabrication and Color Measurement of Painted Products)

The bright pigment powders obtained in Examples, Comparative Example, and Reference Examples and the substrate pigment powders employed in Examples, Comparative Example, and Reference Examples were used to fabricate painted products. Each painted product was fabricated as follows: A paint composition was prepared by mixing 10 wt % of the powder with an acrylic resin and was applied to a piece of white paper as a substrate material. The thickness of the paint film was controlled to 70 to 80 μm.

Color measurement of each painted product was carried out using a multi-angle spectrocolorimeter, "BYK-mac" (manufactured by BYK-Gardner GmbH), with the light source being placed so that light impinged on the painted product at an incident angle of 45°. When defining the angle of the direction of specular reflection of light as 0° and the angle of the direction of incidence of light as 90° (which means that the angle of the direction perpendicular to the surface of the painted product is defined as 45°), the measurement angles were −15°, 15°, 25°, 45°, 75°, and 110°. An average of measured values at the first three measurement angles close to 0° was determined as "highlight" (color measured in the near-specular reflection region) while an average of measured values at the other three angles was determined as "shade" (color measured away from the specular reflection region). The results are shown in Table 2.

For the h value of the substrate pigments, there were adopted measured values for the painted products (the h value of the highlight) which would more exactly represent actual colors visually observed than measured values for the pigment powders themselves. The reason why the h value of the painted products was measured is that the substrate pigments were not colored (observed color was interference color) unlike the colored bright pigments, and complementary colors would be detected if the substrate pigments in the form of a powder were subjected to the measurement of the h value.

(Measurement of Content)

The content was measured by dissolving gold in aqua regia and subjecting the solution to ICP-MS. A 10-mg sample was weighed and gently placed at the bottom of a PTFE vessel of an autoclave. A volume of 5 ml of aqua regia was injected with a measuring pipette into the PTFE vessel containing the sample. The metal chamber of the autoclave was hermetically closed, and the sample was heat-treated at 150° C. for 7 hours. After cooling to ordinary temperature, the chamber was opened to take out the solution. The solution was diluted to a predetermined concentration, and then the concentration of the solution was measured by ICP-MS. The content of gold was calculated from the dilution ratio. The results are shown in Table 1.

The values shown for Examples 2 and 4 in the columns headed "Substrate pigment" in Table 1 are those measured for the substrate pigments (see Examples 1 and 3) with titanium oxide layers having the same thicknesses as the titanium oxide layers of Examples 2 and 4.

TABLE 1

|  | Titanium oxide layer | | Content of fine particles (%) | C* (Powder) | | | h | |
| --- | --- | --- | --- | --- | --- | --- | --- | --- |
|  | Thickness (nm) | Interference color |  | Substrate pigment | Bright pigment | ΔC* | Substrate pigment (Color measured for painted product) | Bright pigment (Powder) |
| Example 1 | 160 | Blue | 0.31 | 6.67 | 33.86 | 27.19 | 269.43 (Blue) | 268.92 (Blue) |
| Example 2 | 160 | Blue | 0.39 | (6.67) | 29.96 | 23.29 | (269.43 (Blue)) | 276.16 (Blue) |

TABLE 1-continued

| | Titanium oxide layer | | Content of fine particles (%) | C* (Powder) | | | Substrate pigment (Color measured for painted product) | Bright pigment (Powder) |
|---|---|---|---|---|---|---|---|---|
| | Thickness (nm) | Interference color | | Substrate pigment | Bright pigment | ΔC* | | |
| Example 3 | 175 | Green | 0.47 | 6.39 | 17.90 | 11.51 | 169.95 (Green) | 188.42 (Green) |
| Example 4 | 175 | Green | 0.39 | (6.39) | 16.98 | 10.59 | (169.95 (Green)) | 207.74 (Green) |
| Comparative Example | 100 | Yellow | 0.34 | 6.01 | 10.37 | 4.36 | 103.56 (Yellow) | 64.05 (Orange) |
| Reference Example 1 | 130 | Red | 0.32 | 6.42 | 22.66 | 16.24 | 0.79 (Red) | 13.22 (Red) |
| Reference Example 2 | 0 | — | 0.19 | 0.88 | 11.8 | 10.92 | — | 352.12 (Red) |

ΔC*: C* (Bright pigment) − C* (Substrate pigment)

TABLE 2

| | C* (Painted product) | | | |
|---|---|---|---|---|
| | Highlight | | Shade | |
| | Bright pigment | ΔC* | Bright pigment | ΔC* |
| Example 1 | 80.7 | 38.6 | 2.6 | −12.3 |
| Example 2 | 52.4 | 10.3 | 12.2 | −2.7 |
| Example 3 | 38.5 | 8.7 | 8.7 | 1.7 |
| Example 4 | 35.4 | 5.6 | 12.4 | 5.4 |
| Comparative Example | 21.1 | 0.7 | 11.8 | 11.3 |
| Reference Example 1 | 45.4 | 15.3 | 8.4 | −0.5 |
| Reference Example 2 | 7.6 | 4.1 | 10.9 | 6.3 |

ΔC*: C* (Bright pigment) − C* (Substrate pigment)

In Examples 1 and 2, a significant increase in the C* value was observed for the pigments (powders), while for the painted products, there were a large increase in the ΔC* of the highlight and a decrease in the ΔC* of the shade. In Examples 1 and 2, especially in Example 1, the metallic appearance was markedly accentuated due to the increased difference between the C* value of the highlight and the C* value of the shade. Also in Examples 3 and 4, an increase in the C* value was observed for the pigments (powders) and, unlike in Comparative Example, the difference between the C* value of the highlight and the C* value of the shade was larger in the case of the bright pigments than in the case of the substrate pigments.

For both the blue bright pigment of Example 1 and the red bright pigment of Reference Example 1, it is thought that the color attributed to the titanium oxide layer and the color attributed to the fine gold particles were very similar. However, the blue bright pigment exhibited a more conspicuous, vivid color. The titanium oxide layer formed in the blue substrate pigment was thicker than that formed in the red substrate pigment. This presumably resulted in the enhanced color vividness; specifically, it is inferred for the blue substrate pigment that crystalline grain growth caused the surface of the layer to have larger asperities which significantly changed how the fine gold particles were supported and that this change helped the fine gold particles to be uniformly distributed as a result of rearrangement caused by heating, or the larger asperities made a greater contribution to increasing the crystallite diameter of the fine gold particles.

To observe the change in the aggregation state of the fine gold particles, the following experiments were carried out.

Example 5

Blue Bright Pigment

Sample A was obtained by performing the procedures described in Example 1 from the beginning to the separation of the bright pigment from the supernatant by filtration. Sample A was dried at 100° C. for 2 hours to obtain Sample B. Sample B was further heat-treated at 700° C. for 2 hours to obtain Sample C.

Example 6

Green Bright Pigment

The bright pigment obtained in Example 3 was used as Sample D.

(Measurement of Crystallite Diameter)

The crystallite diameter of the fine gold particles was measured for Samples A to D. The crystallite diameter was determined by analyzing a diffraction spectrum obtained by X-ray diffraction measurement (using "SmartLab" manufactured by Rigaku Corporation as an X-ray diffractometer) of each sample powder. The sample powder charged in a sample holder made of glass was subjected to θ-2θ measurement using Cu Kα X-ray (wavelength=1.54 Å).

The crystallite diameter D (Å) was determined in the following manner. The integral width of a Au (111) diffraction line observed at 2θ of around 38.2° in the X-ray diffraction spectrum was determined by peak fitting, then correction for subtracting a diffraction line width attributed to the diffractometer was made to obtain an integral width βi (°) attributed to the sample, and the crystallite diameter was calculated by Scherrer's equation: $D=180\lambda/(\beta i \pi \cos \theta)$. λ (Å) represents the wavelength of the measurement X-ray, and θ represents the Bragg angle of the diffraction line. For the peak fitting, given the presence of a diffraction line attributed to $TiO_2$ in the vicinity of the Au (111) diffraction line, the X-ray diffraction spectrum of a substrate prepared in the same manner as the sample except without adsorption of Au was separately measured, and this spectrum was used as a baseline to obtain the net peak of the Au (111)

diffraction line. The results are shown in Table 3 together with the C* values of the samples determined in the same manner as above.

TABLE 3

|  | Substrate pigment | Heat-treatment temperature | Crystallite diameter (nm) | C*(Powder) |
|---|---|---|---|---|
| Sample A | Blue | (Unheated) | 8.8 | 6.7 |
| Sample B | Blue | 100° C. (Dried) | 10.0 | 28.2 |
| Sample C | Blue | 700° C. | 14.7 | 32.0 |
| Sample D | Green | 700° C. | 27.8 | 17.9 |

Comparison of Sample B and Sample C reveals that heat-treatment at a high temperature causes an increase in the crystallite diameter of the fine gold particles, thus leading to an increase in the C* value. When Sample A and Sample B are compared, the C* value of Sample B is significantly higher despite little difference in crystallite diameter. This is presumably due to rearrangement of the fine gold particles. When the heat treatment temperature was the same, the thicker the titanium oxide layer was, the larger the crystallite diameter of the fine gold particles was (Samples C and D). The reason why the chroma of the bright pigment as Sample C was higher than that of the bright pigment as Sample D is presumably that, in Sample C, the reflected color of the substrate pigment and the reflected color of the fine gold particles were very similar.

The invention claimed is:

1. A bright pigment comprising: a glass flake; a titanium oxide layer formed over the glass flake; and fine gold particles deposited on the titanium oxide layer or placed between the glass flake and the titanium oxide layer, wherein
the titanium oxide layer has a thickness of 150 nm or more,
a reflected color of the bright pigment, as measured using illuminant D65, is represented by a C* value of 15 or more and a h value of 150 to 300 in a L*C*h color system, and
the fine gold particles have a crystallite diameter of 12 nm or more.

2. The bright pigment according to claim 1, wherein the h value is in the range of 225 to 300.

3. The bright pigment according to claim 2, wherein the C* value is 25 or more.

4. The bright pigment according to claim 1, wherein the h value is in the range of 150 to 225.

5. The bright pigment according to claim 1, wherein the thickness of the titanium oxide layer is 150 nm to 185 nm.

6. The bright pigment according to claim 1, wherein a content of the fine gold particles is 0.01 to 3%, the content being defined as a ratio of the mass of the fine gold particles to the total mass of the glass flake, the titanium oxide layer, and the fine gold particles.

7. A pigment-containing composition comprising the bright pigment according to claim 1.

8. A pigment-containing painted product comprising a substrate material and a paint film formed on the substrate material, the paint film containing the bright pigment according to claim 1.

9. A method for producing a bright pigment comprising a glass flake, a titanium oxide layer formed over the glass flake, and fine gold particles deposited on the titanium oxide layer or placed between the glass flake and the titanium oxide layer, the method comprising:
a deposition step of bringing a substrate pigment comprising the glass flake with the titanium oxide layer or the glass flake into contact with a colloidal gold solution containing fine gold particles with an average particle diameter of 1 to 40 nm so as to deposit the fine gold particles on the titanium oxide layer of the substrate pigment or on the glass flake; and
a heating step of heating the substrate pigment having the fine gold particles deposited on the titanium oxide layer or a fine particle-enclosing pigment having the titanium oxide layer formed over the surface of the glass flake having the fine gold particles deposited thereon so that a reflected color of the heated substrate pigment having the fine gold particles deposited thereon or the heated fine particle-enclosing pigment, as measured using illuminant D65, has an increased C* value in a L*C*h color system, wherein
the titanium oxide layer of the substrate pigment or the titanium oxide layer of the fine particle-enclosing pigment has a thickness of 150 nm or more,
a reflected color of the bright pigment, as measured using illuminant D65, is represented by a C* value of 15 or more and a h value of 150 to 300 in the L*C*h color system, and
the fine gold particles have a crystallite diameter of 12 nm or more.

10. The method according to claim 9, wherein
in the deposition step, the fine gold particles are deposited on the titanium oxide layer of the substrate pigment, and
in the heating step, the substrate pigment is heated in the absence of a layer covering the fine gold particles.

* * * * *